Figure 1:
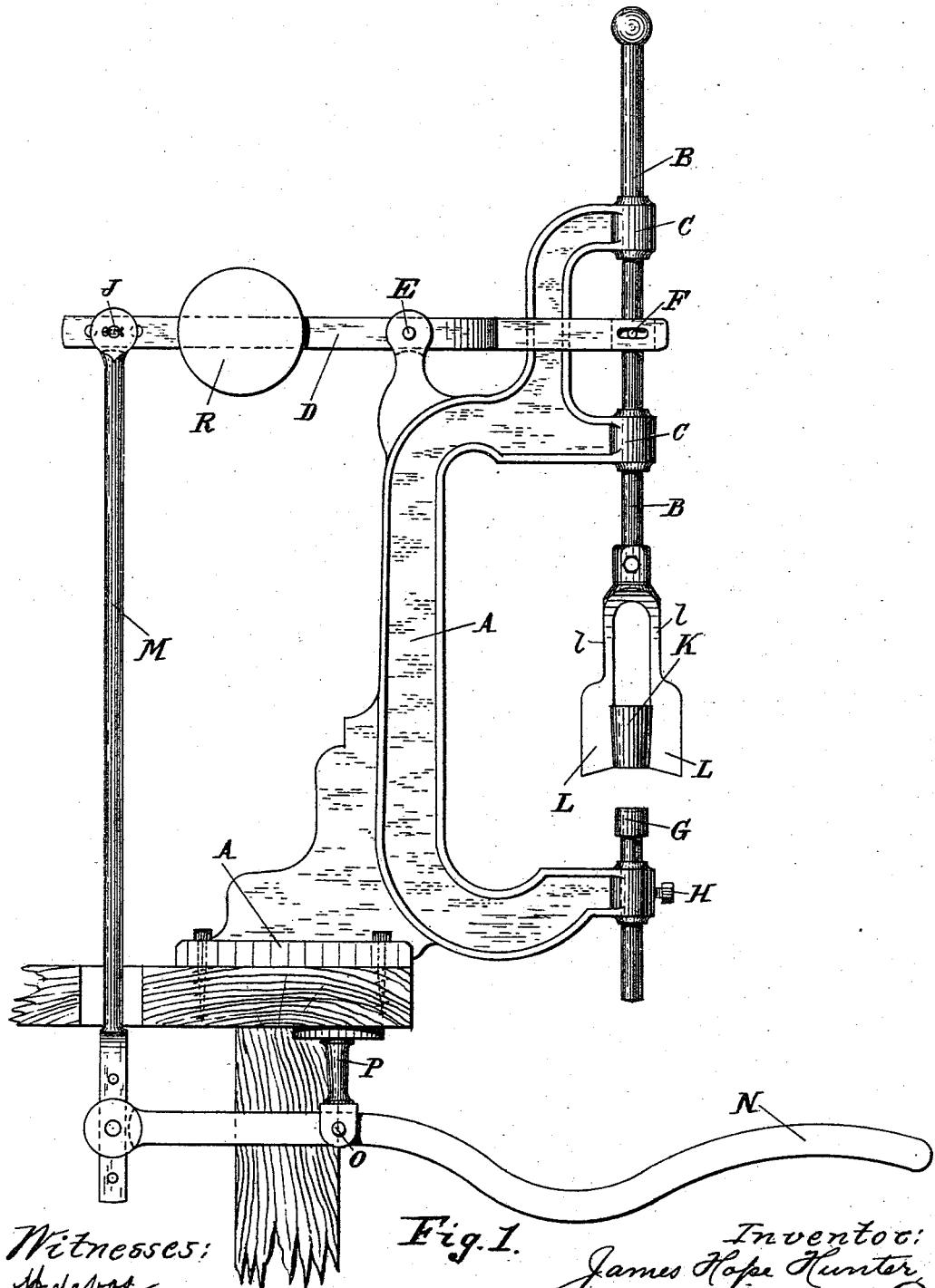

(No Model.) 2 Sheets—Sheet 2.
J. H. HUNTER.
APPARATUS FOR STONING FRUIT.
No. 439,155. Patented Oct. 28, 1890.
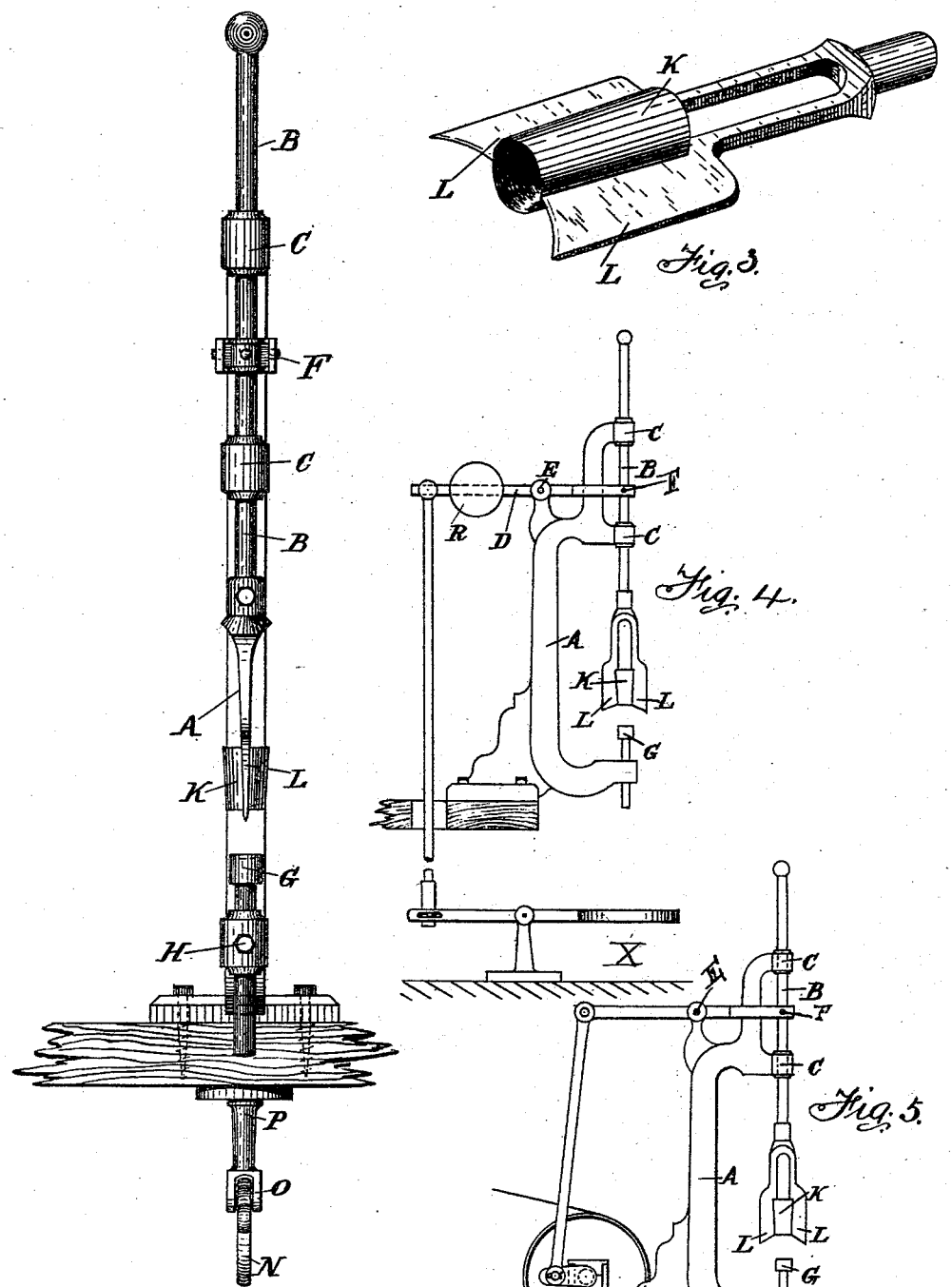
Witnesses:
H. deVos
E. L. Richards
Inventor:
James Hope Hunter,
By Richards &c.
Attorneys.

UNITED STATES PATENT OFFICE.

JAMES HOPE HUNTER, OF BUENOS AYRES, ARGENTINE REPUBLIC.

APPARATUS FOR STONING FRUIT.

SPECIFICATION forming part of Letters Patent No. 439,155, dated October 28, 1890.

Application filed July 11, 1889. Serial No. 317,220. (No model.)

*To all whom it may concern:*

Be it known that I, JAMES HOPE HUNTER, of Buenos Ayres, Argentine Republic, a subject of the Queen of Great Britain and Ireland, have invented Improved Apparatus for Stoning or Coring and Slicing Stoned or other Fruit, of which the following is a specification.

My invention relates to apparatus for the treatment of fruit prior to preservation for exportation or other purposes, in which it is desired to remove the stone or core and at the same time to slice the fruit—such as peaches, apples, or pears, &c.—into two or more portions, and it is carried out in an extremely simple, cheap, and efficacious manner.

Figure 1 shows a side elevation of my apparatus. Fig. 2 is a front elevation of the same. Fig. 3 is a perspective view of a cutter employed therein. Fig. 4 shows the machine arranged to be operated by a treadle. Fig. 5 shows an arrangement by which the machine may be operated by a rotary motion when a steam or other motor is used.

My apparatus consists in a suitable frame A to be attached to a bench or other support.

The upper part of the frame carries a sliding rod or bar B, guided by bearings C C in the frame and reciprocated up and down by a lever D, which has its fulcrum at E upon the back of the frame, and is pivoted at F to the sliding bar B.

The opposite end J of the lever D is connected by the connecting-rod M to the operating-lever N, which is pivoted at O to a suitable bracket P fixed to the bench. This lever N is arranged so that the handle conveniently projects toward the operator standing in front of the frame, who can thus operate the machine with one hand while he handles the fruit with the other.

Upon the lever D a weight R is arranged so as to counterbalance the weight of the sliding bar B and levers D and N.

For the hand-lever operating the cutter-bar I may substitute an equivalent treadle motion for operation by the foot of the laborer, as shown at X in Fig. 4, or, equivalently, a wheel might be fitted with crank motion to effect the reciprocation of the cutter-bar, either by hand or with a pulley, revolved by a machine-band driven by steam or other power, as shown in Fig. 5.

Fitted to the under projecting portion of the frame is a cylindrical rest or support G of small size cupped at the upper end to form a rest for the fruit. This support G may be adjusted and locked in position by a set-screw H at any convenient height.

The before-described reciprocating rod or spindle B is fitted with a cutting-tool K, made of fine steel, with the lower edges sharpened to the requisite keenness. The shape of the cutting-tool is that of a hollow cylindrical punch with a sharp cutting-edge at the lower face and provided with two or more radially-spreading wings L, the lower edges of which are also sharpened to a cutting keenness. The cutting-tool is left open at the top for the escape of that part of the fruit that is forced up through it, and is supported so as not to impede such escape by the bifurcated shank *l l*, the latter forming upward extensions of the blades or wings L. The hollow punch serves the purpose of cutting out the stone from stoned fruit—such as peaches—or for coring apples or pears, and the pair of radial wings L at the same time slices the fruit in two, and if more wings are used they will serve to slice the fruit into any number of desired portions. A variety of such cutters may be provided with the machine to suit the various sizes of fruits and to cut out the cores of various classes of fruits. The said hollow punch K is made so as to fit over the cylindrical rest G on which the fruit stands, so that the cutter descends over the top of the rest so as to completely finish the cut, and is thereafter checked by a collar adjustable on the cutter-spindle without injury to its cutting-edges.

The method of operation is for the laborer to adjust the fruit in the requisite position upon the cylindrical rest G with the left hand, while the cutter K is brought down smartly on the fruit by operating the hand-lever N with the right hand, the core or stone being ejected through the hollow punch, and the sliced fruit falls apart into a suitable receptacle below. The fruit may be skinned by a distinct operation before or after the slicing and stoning or coring operation.

This apparatus I have found in practice to be most effective for its purpose and such as to enable one laborer to do as much work as about eight to ten men working with an ordinary hand-knife and giving a cleanly and finished appearance not to be attained by the use of the knife.

It is obvious that considerable economy may be effected by duplicating the machines, so that the attendant may feed two machines, one with each hand, thereby reducing the amount of labor required.

Having now particularly described and ascertained the nature of my said invention and in what manner the same is to be performed, I declare that what I claim is—

1. In an apparatus for stoning and cutting fruit, the combination, with the vertical shaft B, carrying the cutter K L L, and the opposing vertically-adjustable support G, having means for securing it in various positions, of the lever D, the weight R, operating to counterbalance said shaft and cutter, and a hand-lever connected with and adapted to operate said lever D, substantially as set forth.

2. In an apparatus for stoning and cutting fruit, the stoning and cutting knife comprising the cylindrical portion K, open at the top, and the slicing-wings L L, in combination with the vertically-adjustable rest G, adapted to fit within said part K and having the set-screw H, substantially as set forth.

3. In a machine for stoning and cutting fruit, the combination, with the frame A, having bearings C, the reciprocating rod B, moving in said bearings and carrying the compound cutter K L, and the cylindrical rest G, entering the descending cutter and adjustable by means of set-screw H, of rods D, M, and N, whereby motion is imparted to the reciprocating rod B, and a weight R, for counterbalancing the weight of rod B and levers D and N, substantially as set forth.

In testimony whereof I have signed my name to this specification in the presence of two subscribing witnesses.

JAMES HOPE HUNTER.

Witnesses:
JOHN C. FELL,
REGINALD W. JAMES.